(12) United States Patent
Oh et al.

(10) Patent No.: US 7,529,544 B1
(45) Date of Patent: May 5, 2009

(54) METHOD AND SYSTEM FOR INITIATING A COMMUNICATION WITH A NETWORK ENTITY TO COMMUNICATE INFORMATION REGARDING A FIXED WIRELESS DEVICE

(75) Inventors: Dae-Sik Oh, Overland Park, KS (US); Jack R. Johnson, Harrisonville, MO (US); Susan Sherwood, Fairway, KS (US); Vicki L. Walton, Lone Jack, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 170 days.

(21) Appl. No.: 10/972,949

(22) Filed: Oct. 25, 2004

Related U.S. Application Data

(63) Continuation-in-part of application No. 10/784,659, filed on Feb. 23, 2004.

(51) Int. Cl.
*H04B 1/38* (2006.01)
*H04M 1/00* (2006.01)

(52) U.S. Cl. .............. 455/426.2; 455/456.3; 455/554.2; 455/572; 455/435.1

(58) Field of Classification Search .............. 455/426.2, 455/554.2, 440, 456.3, 572, 574, 426.1, 456.5, 455/435.1
See application file for complete search history.

(56) References Cited

U.S. PATENT DOCUMENTS

| | | | |
|---|---|---|---|
| 5,327,144 A | 7/1994 | Stilp et al. | |
| 5,450,613 A | 9/1995 | Takahara et al. | |
| 5,475,735 A * | 12/1995 | Williams et al. | 455/403 |
| 5,515,419 A * | 5/1996 | Sheffer | 455/456.5 |
| 5,564,072 A | 10/1996 | Garcia Aguilera et al. | |
| 5,603,095 A * | 2/1997 | Uola | 455/554.2 |
| 5,812,955 A * | 9/1998 | Dent et al. | 455/561 |
| 5,991,885 A * | 11/1999 | Chang et al. | 713/300 |
| 6,028,915 A | 2/2000 | McNevin | |
| 6,078,821 A * | 6/2000 | Kaschke et al. | 455/507 |
| 6,088,589 A | 7/2000 | Valentine et al. | |
| 6,201,856 B1 | 3/2001 | Orwick et al. | |
| 6,215,279 B1 * | 4/2001 | Rakovski et al. | 320/135 |
| 6,301,472 B1 * | 10/2001 | Nakasu et al. | 455/405 |
| 6,503,095 B1 * | 1/2003 | Endo et al. | 439/397 |
| 6,577,882 B1 * | 6/2003 | Roos | 455/572 |
| 6,598,003 B1 * | 7/2003 | Heino et al. | 702/68 |
| 6,707,888 B1 | 3/2004 | Cope | |
| 6,775,563 B2 * | 8/2004 | Younis | 455/573 |
| 6,836,644 B2 | 12/2004 | Bacon et al. | |
| 6,940,407 B2 * | 9/2005 | Miranda-Knapp et al. | 340/572.1 |
| 6,992,599 B2 * | 1/2006 | Vergnaud et al. | 340/999 |
| 7,130,641 B1 * | 10/2006 | Al-Khashti et al. | 455/456.1 |
| 2002/0098859 A1 * | 7/2002 | Murata | 455/522 |
| 2002/0164993 A1 | 11/2002 | Elliot | |
| 2003/0017843 A1 * | 1/2003 | Noblins | 455/553 |
| 2003/0039360 A1 * | 2/2003 | Younis | 380/270 |
| 2003/0060215 A1 | 3/2003 | Graham | |
| 2003/0073438 A1 | 4/2003 | Fukushima et al. | |

(Continued)

*Primary Examiner*—George Eng
*Assistant Examiner*—Brandon J Miller

(57) ABSTRACT

A method, system, and apparatus for initiating a communication between a fixed wireless device and a network entity. A wireless local loop hub or other fixed wireless device upon being reconnected to fixed-position power, will determine if fixed-position power was disconnected for a time-duration exceeding a time-threshold, and if so, responsively initiating a communication with a network entity in order to communicate information regarding the wireless local loop hub or other fixed wireless device.

19 Claims, 5 Drawing Sheets

U.S. PATENT DOCUMENTS

| | | |
|---|---|---|
| 2004/0038664 A1 | 2/2004 | Stoks |
| 2004/0116149 A1* | 6/2004 | Yukie et al. ............... 455/550.1 |
| 2004/0204172 A1* | 10/2004 | Herle ......................... 455/572 |
| 2004/0263122 A1* | 12/2004 | Morisawa ................... 320/127 |
| 2005/0037729 A1 | 2/2005 | Dupont et al. |
| 2005/0063519 A1 | 3/2005 | James |

* cited by examiner

METHOD AND SYSTEM FOR INITIATING A COMMUNICATION WITH A NETWORK ENTITY TO COMMUNICATE INFORMATION REGARDING A FIXED WIRELESS DEVICE

REFERENCE TO RELATED APPLICATION

This application is a continuation-in-part of co-pending U.S. patent application Ser. No. 10/784,659, filed Feb. 23, 2004, which is incorporated herein by reference.

BACKGROUND

1. Field of Invention

The present invention relates to wireless devices that operate in wireless networks, and more particularly to fixed wireless devices.

2. Description of Related Art

A wireless device works cooperatively with a radio access network (RAN) to allow the wireless device and/or a user of the wireless device to communicate with a remote device and/or a user of the remote device. More specifically, a wireless device works cooperatively with a particular wireless local loop (WLL) of a RAN. A WLL includes: (i) a base transceiver station (BTS), (ii) an air interface between a particular wireless device and the BTS, (iii) a base station controller (BSC), (iv) a first coupling mechanism that couples the BTS to the BSC, and (v) a second coupling mechanism that couples the BSC to a mobile switching center (MSC). The MSC is a switch for setting up and tearing down phone calls between the wireless device and a remote device, such as a device in the public switched telephone network (PSTN) or a remote device in a RAN. An air interface is arranged according to an air interface protocol, such as the Advanced Mobile Phone Service (AMPS), Code Division Multiple Access (CDMA), Time Division Multiple Access (TDMA), or Global System for Mobile communication (GSM) air interface protocols.

A wireless device may be a fixed wireless device. A fixed wireless device works at a fixed location and typically does not work while being moved from a first fixed location to a second fixed location. A fixed wireless device may receive operating power from a portable power source and/or from a fixed-position power source. A fixed-position power source provides fixed-position power at a fixed location, such as a house or an office. An example of fixed-position power is alternating current (AC) power provided to a house via electrical transmission lines from an electric generator. An example of a portable power source is a battery, such as a lithium-ion battery. A fixed wireless device could use a portable power source as a backup power source in case fixed-position power to the fixed wireless device is disconnected.

A WLL hub is an example of a fixed wireless device. A WLL hub can operate at a fixed location to provide an interface to a wireless network. The interface to the wireless network can be provided to land-line telephone equipment that is coupled to the WLL hub. Examples of land-line telephone equipment include a telephone, an answering machine, and a facsimile machine that can access a PSTN via local loop telephone lines coupled to the land-line telephone equipment. Providing land-line telephone equipment with an interface to a wireless network allows the land-line telephone equipment to access the PSTN via the wireless network. In this regard, the WLL hub and the wireless network allow the land-line telephone equipment to access the PSTN even if the land-line telephone equipment is not coupled to local loop telephone lines.

Local loop telephone lines couple land-line telephone equipment to a central office switch. A central office switch provides land-line telephone equipment coupled to the central office switch with: (i) a dial tone that indicates when a phone number can be dialed, and (ii) a signal that indicates when the land-line telephone equipment should ring to announce an incoming call. A WLL hub can provide land-line telephone equipment coupled to the WLL hub with tones and signals typically provided by a central office switch. For example, a WLL hub can provide land-line telephone equipment with: (i) a dial tone to indicate that a phone number can be dialed, and/or (ii) a signal that indicates when the land-line telephone equipment should ring to announce an incoming call. Other examples of tones and signals that a WLL hub can provide to land-line telephone equipment are also possible.

A wireless carrier is an entity that provides wireless service to a wireless device user via a RAN. In the United States, the Federal Communications Commission (FCC) requires a wireless carrier to perform certain functions. Some of the FCC requirements relate to phone calls made via a wireless carrier's RAN by dialing the digits 9, 1, and 1 (a "9-1-1 call"). For example, the FCC requires a wireless carrier to route all 9-1-1 calls originated on one of the wireless carrier's radio access networks to a public safety answering point (PSAP). As another example, the FCC requires a wireless carrier to provide automatic location information (ALI) to a PSAP that answers a 9-1-1 call placed via one of the wireless carrier's radio access networks. ALI indicates data about the wireless device placing the 9-1-1 call. Examples of ALI include: (i) a latitude and a longitude that indicate the location of a wireless device placing the 9-1-1 call, and (ii) a ten-digit phone number of a wireless device placing the 9-1-1 call.

A wireless carrier may use any of a variety of methods to determine the location of a wireless device so as to facilitate providing ALI. For example, a wireless carrier may use a method that involves determining the location of a wireless device from positioning determining equipment (PDE) and a mobile positioning center (MPC). The PDE and the MPC are devices located in a wireless carrier's network that work cooperatively to determine the location of a wireless device. As another example, a wireless device can provide the current location of the wireless device to the wireless carrier. In this regard, the wireless device could comprise a global positioning system (GPS) receiver for determining the location of the wireless device and a communication interface for transmitting its location to a network entity in the wireless carrier's network.

A location of a fixed wireless device can be stored in a network entity and the location stored in the network entity will be accurate so long as the fixed wireless device remains at the location. Examples of network entities that can store a location of a fixed wireless device include an MPC, a data storage device coupled to an MPC, or a data storage device coupled to another network server. Other examples of network entities that can store a location of a fixed wireless device are also possible.

After storing a location of a fixed wireless device in a network entity, the network entity may provide the location to a remote entity that requests the location of the fixed wireless device. For example, the remote entity may be a PSAP that requests the location of the fixed wireless device so that the PSAP can dispatch emergency personnel to the location. As another example, the remote entity could be a network server that requests the location of the fixed wireless device so that the network server can send particular information to a user of the fixed wireless device based on the location. For instance, the information could indicate a grocery store located near the location that is willing to deliver its products to a user of the fixed wireless device at the location.

A problem could arise if a fixed wireless device is moved from a first location to a second location after storing the first location in a network entity. For example, after storing the first location in a network entity and moving the fixed wireless device to a second location, the fixed wireless device could be used to place a 9-1-1 call to a PSAP that then requests the location of the fixed wireless device from the network entity. Since the first location is stored in the network entity, the first location is reported to the PSAP as the location of the fixed wireless device even though the fixed wireless device is now located at the second location. If the PSAP dispatches emergency personnel to the first location instead of the second location, the emergency personnel may arrive at the second location too late to assist the caller at the second location. Other examples of problems that might arise after moving a fixed wireless device from a stored location without updating the stored location are also possible.

SUMMARY

A fixed wireless device can operate at a first location that can be stored in data storage as a registered location. Afterwards, the fixed wireless device can be moved from the first location to a second location. After moving the fixed wireless device from the first location to the second location, the registered location needs to be updated in order for the registered location to match the second location. If the registered location is not updated with the second location, then an entity receiving the registered location may receive an incorrect registered location. As a result, the entity may not be able to provide a requested service to a user of the fixed wireless device at the second location in a timely fashion.

The present invention provides a solution to this problem. In accordance with the invention, when a fixed wireless device is connected to fixed-position power after having been disconnected from fixed-position power, the fixed wireless device detects that it was disconnected from fixed-position power for at least a threshold period of time. The fixed wireless device will then responsively initiate a communication with a network entity in order to communicate information regarding the fixed wireless device. The fixed wireless device and the network entity can each communicate information regarding the fixed wireless device. An example of the information regarding the fixed wireless device is the current location of the fixed wireless device.

In one respect, an exemplary embodiment of the present invention includes a system that includes: (i) power logic that detects disconnection and connection of fixed-position power to the system, (ii) data storage for storing a time-threshold, (iii) time logic that determines a time-duration and whether the time-duration exceeds the time-threshold, and (iv) a communication interface for initiating a communication with a network entity and for communicating a location regarding the fixed wireless device. Initiating the communication occurs in response to the determination that the time-duration exceeds the time-threshold. The time-duration is a quantity of time indicating how long fixed-position power was disconnected from the fixed wireless device before being re-connected to the fixed wireless device. The time-threshold is a quantity of time during which the fixed wireless device may have been moved from a registered location.

In another respect, the exemplary embodiment includes a method involving: (i) determining, upon a connection of fixed-position power to a WLL hub, that fixed-position power to the WLL hub had been disconnected for a time-duration that exceeds a time-threshold, and (ii) responsively initiating a communication with a network entity in order to communicate information regarding the WLL hub.

In yet another respect, the exemplary embodiment includes a WLL hub that includes: (i) data storage for storing a time-threshold, (ii) power logic for detecting disconnection and connection of fixed-position power to the WLL hub, (iii) time logic for determining a time-duration and for determining if the time-duration exceeds the time-threshold, (iv) location logic for determining a current location of the WLL hub, and (v) a communication interface for providing the current location of the WLL hub to a network entity in response to the time logic determining that the time-duration exceeds the time-threshold.

In still yet another respect, the exemplary embodiment includes a WLL hub that includes: (i) means for determining, upon a connection of fixed-position power to the WLL hub, that fixed-position power to the WLL hub had been disconnected for a time-duration that exceeds a time-threshold, and (ii) means for responsively initiating a communication with a network entity in order to communicate information regarding the WLL hub.

These as well as other aspects and advantages will become apparent to those of ordinary skill in the art by reading the following detailed description, with reference where appropriate to the accompanying drawings. Further, it should be understood that the embodiments described in this summary and elsewhere are intended to be examples only and do not necessarily limit the scope of the invention.

BRIEF DESCRIPTION OF DRAWINGS

An exemplary embodiment of the invention is described herein with reference to the drawings, in which.

DETAILED DESCRIPTION

1. Overview

The present invention provides a mechanism for initiating a communication between a fixed wireless device and a network entity in order to communicate information regarding the fixed wireless device. According to an exemplary embodiment of the invention, upon connecting fixed-position power to a fixed wireless device, the fixed wireless device determines if fixed-position power to the fixed wireless device had been disconnected for a time-duration that exceeds a time-threshold and if so, responsively initiates a communication with a network entity so that information regarding the fixed wireless device can be communicated.

Figure 1:
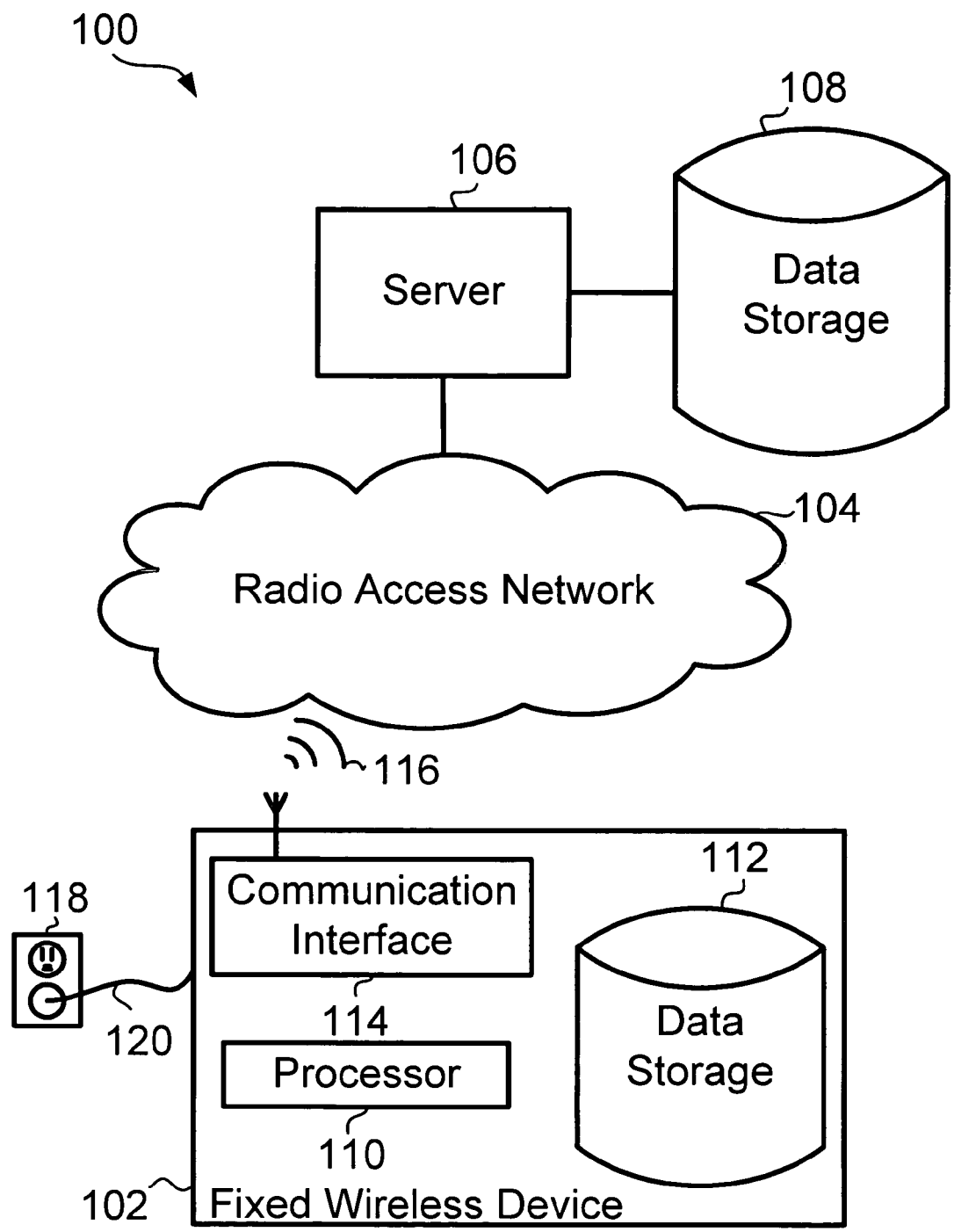
FIG. 1 is a simplified block diagram of a system in which the exemplary embodiment can be implemented.

In one respect, as shown in FIG. 1, the exemplary embodiment includes a system 100. The system 100 includes a fixed wireless device 102, a radio access network (RAN) 104, a network server 106, and first data storage 108. The fixed wireless device 102 includes a processor 110, second data storage 112, and a communication interface 114. The RAN 104 includes a radio frequency (RF) air interface 116 for performing communication between the RAN 104 and the communication interface 114.

The fixed wireless device 102 couples to a fixed-position power source 118 via a fixed-position power cord 120. An example of the fixed-position power source 118 is a single-phase alternating-current (AC) wall outlet that provides AC power at a voltage level between the range of substantially 110-120 volts AC. The fixed-position power source 118 could receive fixed-position power from an electrical generator. Other examples of the fixed-position power source 118 are also possible.

The system 100 determines when fixed-position power from the fixed-position power source 118 is connected to the fixed wireless device 102 and then determines whether fixed-position power had been disconnected from the fixed wireless device 102 for a time-duration that exceeds a time-threshold. The fixed-position power from the fixed-position power source 118 can be disconnected from the fixed wireless device 102 in various ways. For example, fixed-position power is disconnected from the fixed wireless device 102 when the fixed-position power cord 120 is disconnected from the fixed position power source 118. As another example, fixed-position power is disconnected from the fixed wireless device 102 when the fixed-position power source 118 stops providing power to the fixed wireless device 102. In this regard, the fixed-position power source 118 might stop providing power when a power transmission line to the fixed-position power source 118 is broken (open circuit) during a high wind condition. Other examples of the fixed-position power being disconnected from the fixed wireless device 102 are also possible.

The time-duration and time-threshold are each a respective quantity of time. The time-duration could be a measured quantity of time or a derived quantity of time. An example of a measured quantity of time is a quantity of time counted by a timer. An example of a derived quantity of time is a quantity of time derived by subtracting a first time-stamp from a second time-stamp. In this regard, the first time-stamp could indicate when fixed-position power was disconnected and the second time-stamp could indicate when fixed-position power was reconnected. An example of the time-threshold is a predetermined quantity of time during which it is more likely than not that a user may have moved the fixed wireless device 102 from a first location to a second location. Other examples of the time-threshold and/or the time-duration are also possible.

The first data storage 108 stores data for the network server 106 and the second data storage 112 stores data for the fixed wireless device 102. The first and second data storage 108, 112 store various types of data. For example, the second data storage 112 could store machine language instructions that are executable by the processor 110, a time-threshold, and a time-duration. As another example, the first and second data storage 108, 112 could each store a location of the fixed wireless device 102. A location stored in the first and/or second data storage 108, 112 is a registered location. Ideally, a registered location matches the current location of the fixed wireless device 102. However, a registered location may not match the current location if the fixed wireless device 102 was moved from a registered location to a new location. Other examples of the data stored in data storage are also possible.

The processor 110 executes a variety of machine language instructions. For example, the processor 110 executes machine language instructions in order to determine whether the fixed-position power source 118 had been disconnected for a time-duration that exceeds a time-threshold. Examples of machine language instructions include: (i) instructions to determine the time-duration that fixed-position power is disconnected, (ii) instructions to read the time-threshold from the second data storage 112, and (iii) instructions to compare the time-duration to the time-threshold.

If the processor 110 determines that fixed-position power had been disconnected for a time-duration that exceeds the time-threshold, the processor 110 works cooperatively with the communication interface 114 to initiate a communication with the network server 106 via the RAN 104. Initiating the communication could involve the communication interface 114 transmitting one or more messages to the RAN 104 via the RF air interface 116.

After initiating the communication, the fixed wireless device 102 and the network server 106 can engage in a communication. Various methods may be employed to engage in the communication. For example, engaging in the communication could involve the fixed wireless device 102 sending information to the network server 106. As another example, engaging in the communication could involve the network server 106 sending information to the fixed wireless device 102. As yet another example, engaging in the communication could involve the fixed wireless device 102 and the network server 106 sending information to each other. Other examples of methods for engaging in the communication are also possible.

While engaging in the communication, information regarding the fixed wireless device 102 can be communicated between the fixed wireless device 102 and the network server 106. A variety of information can be communicated. For example, the information could indicate the current location of the fixed wireless device 102. In this regard, the current location can be compared to a registered location. If the current location does not match the registered location, then the current location can be stored as the registered location to update the registered location. If the registered location matches the current location, no change to the registered location is required. Other examples of information communicated between the fixed wireless device 102 and the network server 106 are also possible.

In order for the fixed wireless device 102 to communicate its current location to the network server 106, the fixed wireless device 102 needs to determine its current location. Various methods could be used by the fixed wireless device 102 to determine its current location. For example, the fixed wireless device 102 could include a GPS receiver and machine language instructions arranged as location logic. In this regard, the processor 110 could receive the GPS signals and execute the location logic (machine language instructions) to determine its current location from the GPS signals. Other examples of methods the fixed wireless device 102 can use to determine its current location are also possible.

2. Overview of a Fixed Wireless Device and a Wireless Network

Figure 2:
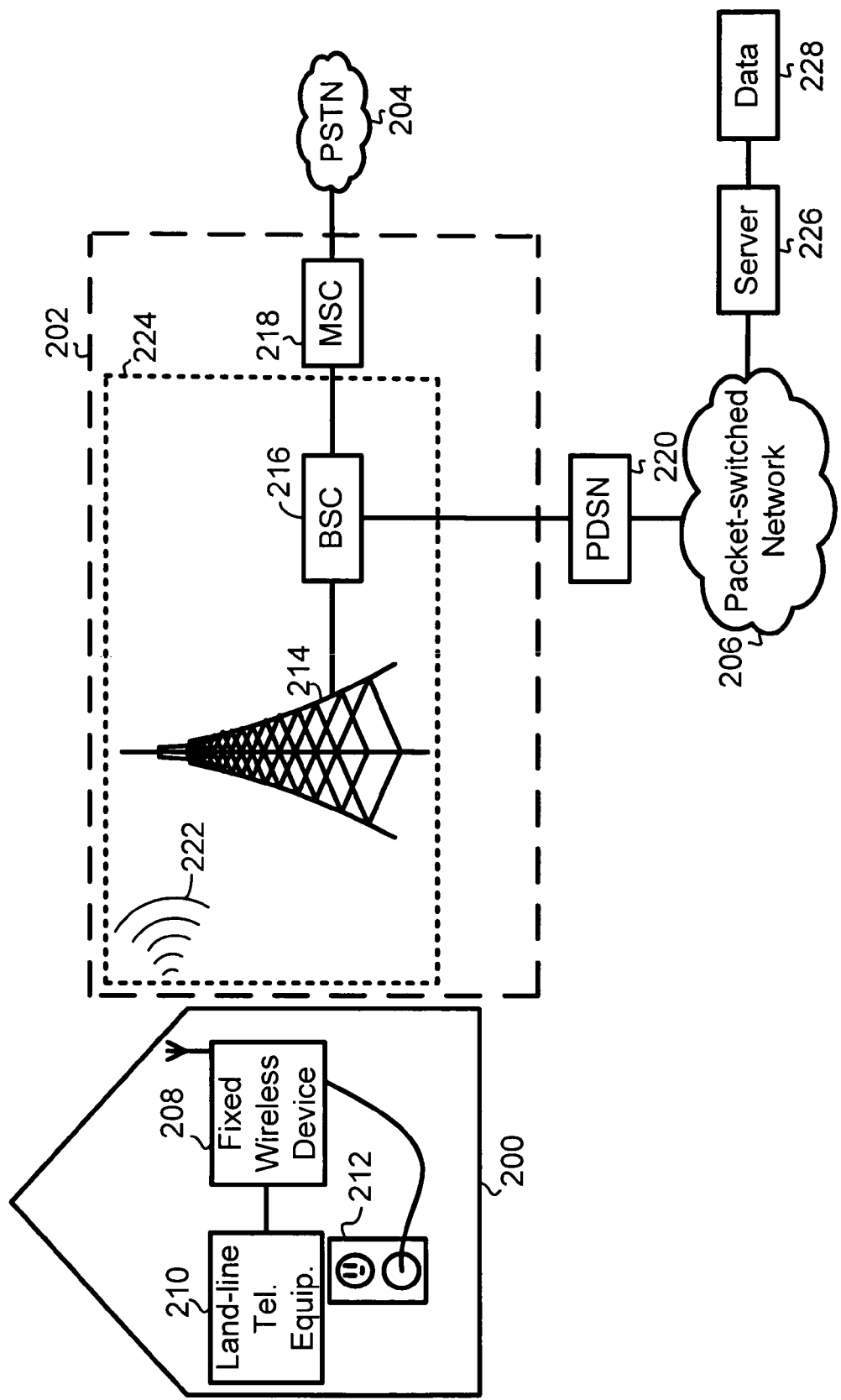
FIG. 2 is a simplified block diagram of a system in which the exemplary embodiment can be implemented.

FIG. 2 is a simplified block diagram of a system in which an exemplary embodiment can be carried out. As illustrated, the system includes a fixed location 200, a wireless network 202, a public switched telephone network (PSTN) 204, and a packet-switched network 206. The fixed location 200 includes a fixed wireless device 208. The fixed wireless device 208 is coupled to land-line telephone equipment 210 and a fixed-position power source 212. The fixed wireless device 208 interfaces to the wireless network 202 so that the land-line telephone equipment 210 can engage in a communication via the wireless network 202, and in turn, the PSTN 204 or the packet-switched network 206.

The wireless network 202 includes a base transceiver station (BTS) 214 coupled with a base station controller (BSC) 216. BSC 216 is in turn coupled with a mobile switching center (MSC) 218, which provides connectivity with the PSTN 204. The BSC 216 is also coupled with a packet data serving node (PDSN) 220, which functions as a gateway to the packet-switched network 206. The wireless network 202 also includes an air interface 222 for communication between the BTS 214 and the fixed wireless device 208.

A wireless local loop (WLL) 224 of the wireless network 202 includes the air interface 222, the BTS 214, and the BSC 216. The WLL 224 provides the fixed wireless device 208 with access to other parts of the wireless network 202, such as the MSC 218.

The fixed wireless device 208 may be configured in various arrangements. For example, the fixed wireless device 208 could be configured to receive power from the fixed-position power source 212. As another example, the fixed wireless device 208 could be configured to receive power from a portable power source. In this regard, the fixed wireless device 208 may use power from a portable power source in combination with fixed-position power, or as back-up power after fixed-position power has been disconnected from the fixed wireless device 208. An example of the fixed wireless device 208 is a WLL hub that provides the land-line telephone equipment 210 with an interface to the WLL 224. Other examples of the fixed wireless device 208 are also possible.

The fixed wireless device 208 works cooperatively with the wireless network 202 to initiate a communication with a remote entity. For instance, the fixed wireless device 208 can initiate a communication by sending an origination request to the wireless network 202. An example of an origination request is a voice call origination message, which may be used to establish a voice call via the PSTN 204. As another example, the origination request could be a packet data session origination request for establishing a packet-data connectivity, such as to facilitate establishing a packet data session, such as a Point-to-Point Protocol (PPP) data session, with the PDSN 220.

As an example of the fixed wireless device 208 establishing a packet data session, the fixed wireless device 208 first sends a packet data origination request to the BTS 214. The BTS 214 then sends the request to the BSC 216, which passes the request to the MSC 218 in order to validate that the fixed wireless device 208 may continue to use the wireless network 202. After validation of the fixed wireless device 208, the BSC 216 establishes a link between the fixed wireless device 208 and the PDSN 220. After establishing the link with the PDSN 220, a second request can be sent to the PDSN 220 for establishing a packet data session with a network entity, such as the network server 226. The PDSN 220 then negotiates with the network server 226 to establish the packet data session.

After establishing the packet data session, the fixed wireless device 208 and the network server 226 may engage in communications with each other. As an example, the communications may take the form of information sent in a hypertext transfer protocol (HTTP) message. As another example, the communications may take the form of information sent in an real-time transport protocol (RTP) packet stream. Other examples of the communications are also possible.

3. Exemplary Fixed Wireless Device

Figure 3:
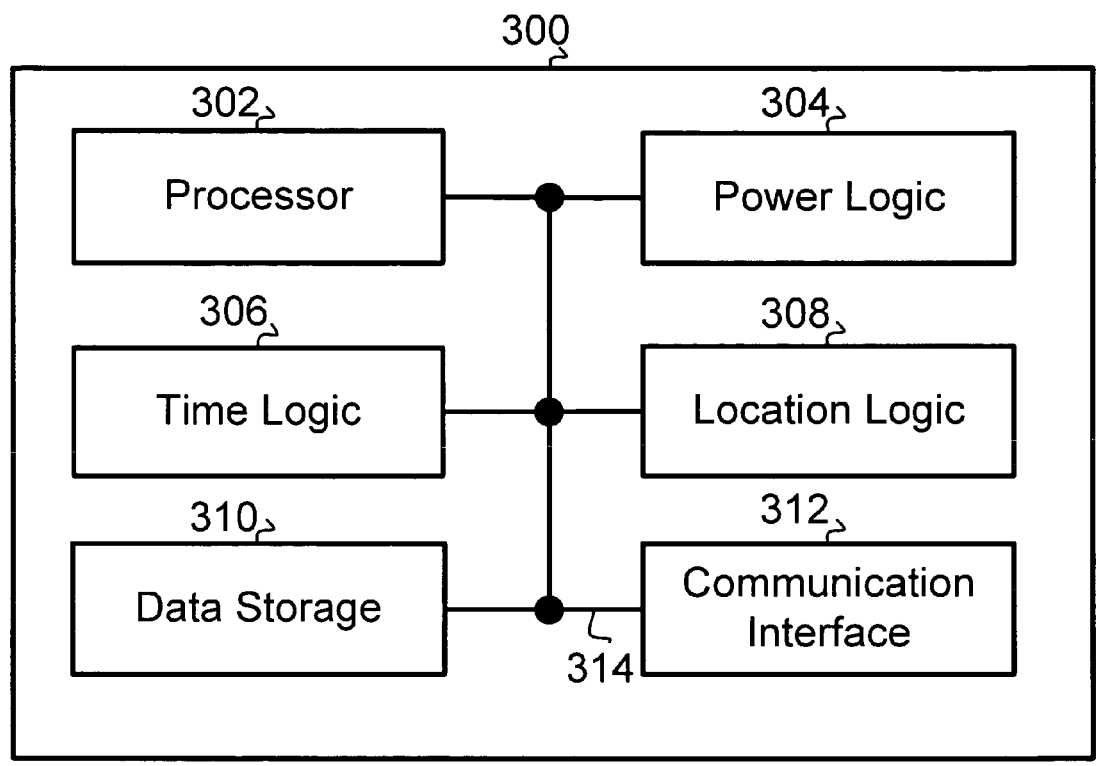
FIG. 3 is a block diagram illustrating functional components of an exemplary fixed wireless device.

FIG. 3 is a block diagram illustrating functional components of an exemplary fixed wireless device 300. The fixed wireless device 300 includes a processor 302, power logic 304, time logic 306, location logic 308, data storage 310, and a communication interface 312, all of which may be coupled together by a system bus or other mechanism 314. The fixed wireless device 102 shown in FIG. 1 and the fixed wireless device 208 shown in FIG. 2 could be arranged as the fixed wireless device 300.

The processor 302 could comprise one or more processors, such as a general purpose processor and/or a digital signal processor. The processor 302 executes machine language instructions that are stored in data storage 310. The power logic 304, the time logic 306, and the location logic 308 may comprise machine language instructions that are executable by the processor 302.

Figure 4:
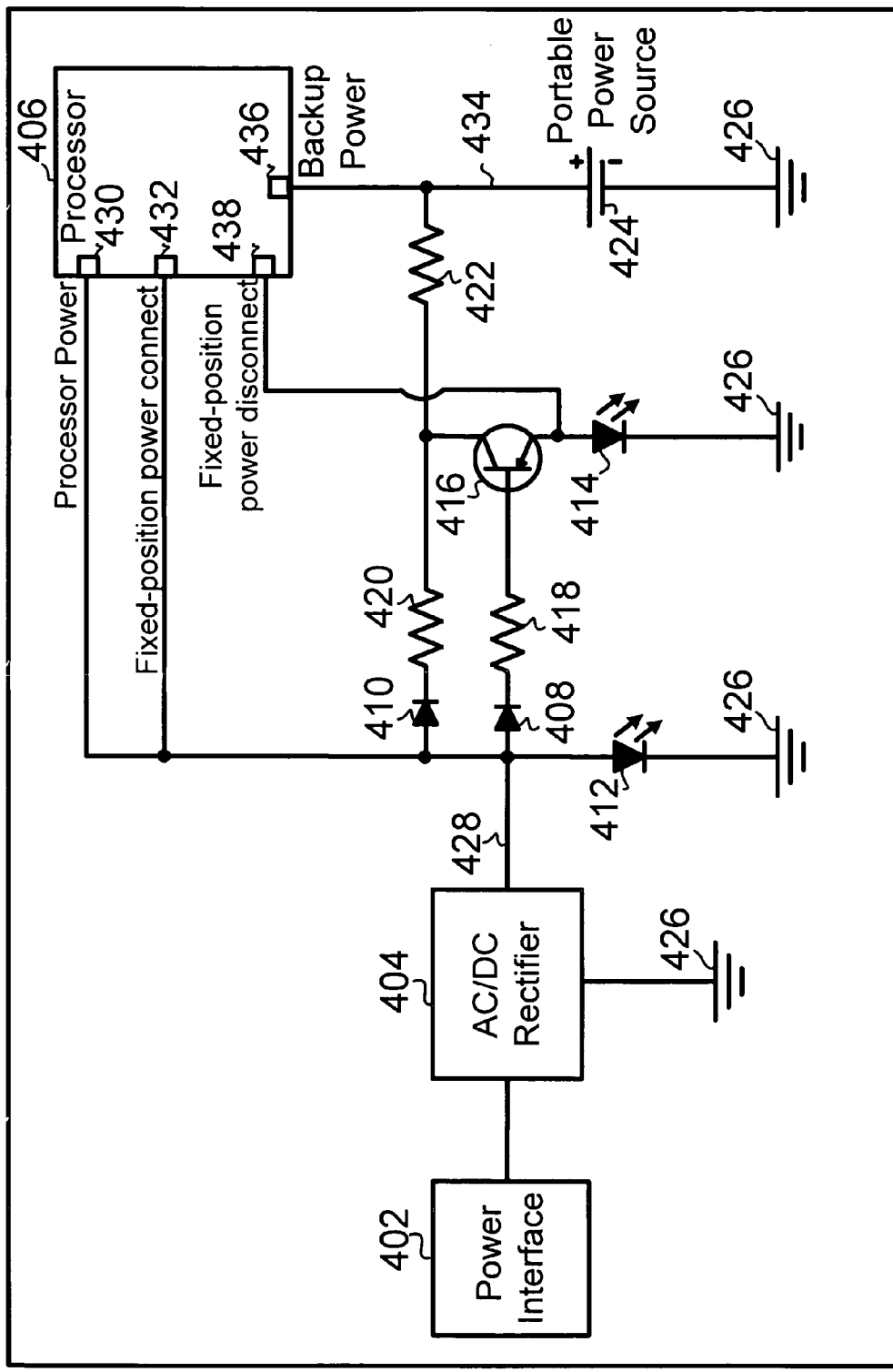
FIG. 4 depicts an exemplary power logic circuit for the exemplary fixed wireless device.

The power logic 304 may comprise both machine language instructions and electronic circuitry. An example of a power logic electronic circuit is shown in FIG. 4. A power logic electronic circuit could interface to a fixed-position power source and provide signaling to the processor 302 to indicate when fixed-position power is connected to or disconnected from the electronic circuit. A power logic electronic circuit could comprise a portable power source for providing portable power for the fixed wireless device 300. Machine language instructions could be arranged as the power logic 304 to detect the disconnection and/or the connection of fixed-position power to the fixed wireless device 300.

The time logic 306 may comprise both machine language instructions and electronic circuitry for performing functions based on time. An example of a function based on time is determining a time-duration, such as the time-duration that occurs between disconnecting and connecting fixed-position power to the fixed wireless device 300. Another example of a function based on time is comparing a time-duration to a time-threshold. An example of electronic circuitry arranged as time logic is circuitry that includes a real time clock for providing time-stamps to a processor, or circuitry that includes a timer for measuring a time-duration. Other examples of the time logic 306 are also possible.

The location logic 308 may comprise both machine language instructions and electronic circuitry. The location logic 308 could be used to determine the current location of the fixed wireless device 300. An example of location logic 308 is (i) an electronic circuit comprising a GPS receiver that receives GPS signals, and (ii) machine language instructions to determine the current location of the fixed wireless device 300 from the GPS signals.

As another example, the location logic may comprise: (i) an interface to a keyboard that couples to the fixed wireless device 300, and (ii) machine language instructions to determine the current location of the fixed wireless device 300 from a location entered on the keyboard. In this regard, a user could enter the current location of the fixed wireless device 300 by typing the current location on the keyboard.

As yet another example, the location logic 308 may comprise machine language instructions for determining the current location of the fixed wireless device 300 from a communication received from a network entity via the communication interface 312. In this regard, the network entity could be a mobile positioning center that works cooperatively with positioning determining equipment to determine the current location of the fixed wireless device 300. Other examples of the location logic 308 are also possible.

The data storage 310 may comprise a computer readable medium, such as a magnetic disc, an optical disc, organic memory, and/or any other volatile or non-volatile mass storage system readable by the processor 302. Alternatively, the data storage 310 may comprise a combination of one or more segments of computer readable media. For example, the data storage 310 could comprise a first segment of data storage at the processor 302 and a second segment of data storage remote from the processor 302. Other examples of the data storage 310 are also possible.

The communication interface 312 could be arranged in a variety of ways to allow the fixed wireless device 300 to engage in communications with a network entity. For example, the communication interface 312 could comprise a wireless telephone interface that includes a chipset and antenna for interfacing with a RAN according to an air interface protocol. An example of a chipset that facilitates air interface communication according to the CDMA air interface protocol is the MSM6000™ chipset manufactured by Qualcomm Incorporated of San Diego, Calif. Other examples of the communication interface 312 are also possible.

4. Exemplary Power Logic Circuit

The power logic 304 described above may include a power logic circuit for detecting when fixed-position power is connected to the fixed wireless device 300 and for detecting when fixed-position power is disconnected from the fixed wireless device 300.

FIG. 4 depicts an exemplary power logic circuit 400 for a fixed wireless device. The power logic 304 shown in FIG. 3 could comprise the power logic circuit 400. The power logic circuit 400 includes a power interface 402, an AC/DC rectifier 404, a processor 406, first and second diodes 408, 410, first and second light emitting diodes 412, 414, a transistor 416, first, second, and third resistors, 418, 420, 422, a portable power source 424, and circuit ground paths 426. The processor 406 could be the processor 302 shown in FIG. 3.

The power interface 402 is used to receive received fixed-position power from a fixed-position power source. The power interface 402 provides power to the AC/DC rectifier 404 when a fixed-position power is connected to the power interface 402. The AC/DC rectifier 404 converts fixed-position power in the form of an AC signal to a first direct current (DC) signal on a first circuit node 428. The AC/DC rectifier 404 could work cooperatively with a step-down transformer to reduce the voltage of the fixed-position power supplied to the power interface 402. For example, the AC/DC rectifier 404 and a step-down transformer could work cooperatively to change a 120 volt AC signal to a 5 volt DC signal.

The first DC signal on the first circuit node 428 is supplied to the processor 406 at first and second processor ports 430, 432. The processor 406 uses the first DC signal at the first processor port 430 as operating power. The processor 406 uses the first DC signal at the second processor port 430 to sense when a fixed-position power source is connected to the power interface 402. Alternatively, the processor 406 could sense when a fixed-position power source is connected to the power interface 402 by detecting the presence of the first DC signal at the first processor port 430.

A second DC signal is supplied on a second circuit node 434 from the portable power source 424. The second DC signal is supplied to a third processor port 436 located at the processor 406. The processor 406 uses the second DC signal at the third processor port 436 as backup power when the fixed-position power source is disconnected from the power interface 402. Alternatively, the processor 406 could use the second DC signal for operating power in conjunction with the first DC signal supplied to the first processor port 430 when fixed-position power source is connected to the power interface 402.

The first LED 412 is turned on when fixed-position power is connected to the power interface 402 and is turned off when fixed-position power is disconnected to the power interface 402. The first DC signal on the first circuit node 428 provides power for turning on the first LED 412. The second LED 414 is turned off when fixed-position power is connected to the power interface 402 and is turned on when fixed-position power is disconnected to the power interface 402. The second DC signal on the second circuit node 434 provides power for turning on the second LED 414.

The resistance values of the first, second, and third resistors 418, 420, 422 may be selected to provide biasing for the transistor 416. For example, the resistance values may be selected (i) to turn off the transistor 416 when fixed-position power to the power interface 402 is connected, and (ii) to turn on the transistor 416 when fixed-position power to the power interface 402 is disconnected. When the transistor 416 is turned off, the second LED is turned off and a fixed-position power disconnect signal is not provided to a fourth processor port 438. However, when the transistor 416 turns on, the second LED 414 turns on and the fixed-position power disconnect signal is provided to the fourth processor port 438. Other exemplary biasing schemes for the transistor 416 are also possible.

The processor 406 could execute machine language instructions: (i) to detect when a signal is present at the second processor port 432 to determine that fixed-position power to the power interface 402 is connected, and (ii) to detect when a signal is present at the fourth processor port 438 to determine that fixed-position power to the power interface 402 is disconnected. Other examples of the power logic circuit 400 are also possible.

5. Exemplary Operation

According to the exemplary embodiment and making reference to FIG. 3, the processor 302 executes the power logic 304 to detect when fixed-position power is connected to the fixed wireless device 300 and then executes the time logic 306 to determine whether the fixed wireless device 300 had been disconnected from fixed-position power for a time-duration that exceeds a time-threshold. If so, the fixed wireless device 300 responsively initiates a communication with a network entity so that information regarding the fixed wireless device 300 can be communicated.

By way of example and with reference to FIG. 3, assume that data storage 310 includes a time-threshold of four hours. Assume next (i) that a user disconnects the fixed wireless device 300 from a first fixed-position power source located at a first location at 12:01 A.M., (ii) the user moves the fixed wireless device 300 from the first location to a second location, and (iii) the user reconnects the fixed wireless device 300 to a second fixed-position power source located at the second location at 5:01 A.M., five hours after disconnecting the fixed wireless device 300 from the first fixed-position power source.

In this example, the power logic 304 detects connection of the second fixed-position power source to the fixed wireless device 300. Then the processor 302 executes the time logic 306 to determine that the fixed wireless device 300 had been disconnected from fixed-position power for a time-duration (five hours) that exceeds the time-threshold (four hours).

Subsequently, the processor 302 works cooperatively with the communication interface 312 to initiate a communication with a network entity, such as the network server 226 shown in FIG. 2, so that information regarding the fixed wireless device 300 can be communicated.

Figure 5:
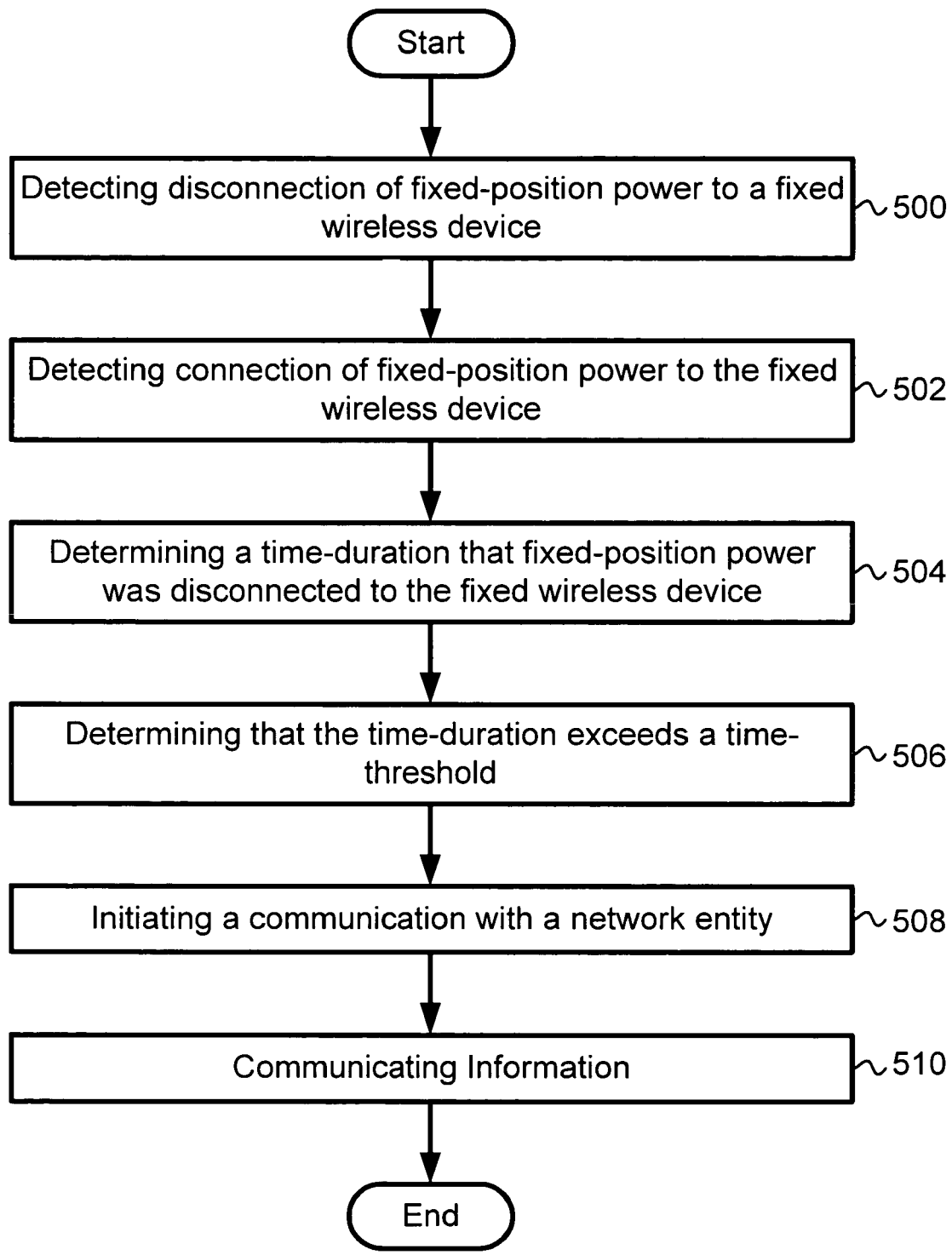
FIG. 5 is a flow chart depicting functions that can be carried out in accordance with the exemplary embodiment.

FIG. 5 is a flow chart provided to illustrate some functions of the exemplary operation. As shown in FIG. 5, block 500 involves detecting disconnection of fixed-position power to a fixed wireless device. As an example and with reference to FIGS. 3 and 4, the processor 302 could execute machine language instructions, arranged as the power logic 304, upon receiving a first signal at the fourth processor port 438, wherein the first signal indicates that fixed-position power has been disconnected from the fixed wireless device 300. In this regard, the processor 302 could detect, by receipt of the first signal and execution of the machine language instructions, that fixed-position power had been disconnected.

The processor 302 could act in a variety of ways in response to detecting that fixed-position power had been disconnected. For example, the processor 302 could store a first time-stamp that indicates the time when fixed-position power was disconnected. As another example, the processor 302 could start a timer to begin counting the amount of time that fixed-position power to the fixed wireless device 300 is disconnected. In this regard, the processor 302 could receive power from a backup power source in order to perform its processing functions, such as storing the time-stamp or starting the timer. Other examples of how the processor 302 responds to detecting that fixed-position power has been disconnected are also possible.

Next at block 502, the exemplary operation involves detecting that fixed-position power is connected to the fixed wireless device. As an example, the processor 302 could execute machine language instructions, arranged as the power logic 304, upon receiving a second signal at the second processor port 432, wherein the second signal indicates that fixed-position power has been connected to the fixed wireless device 300. In this regard, the processor 302 could detect, by receipt of the second signal and execution of the machine language instructions, that fixed-position power has been re-connected.

The processor 302 could act in a variety of ways in response to detecting that fixed-position power had been re-connected. For example, the processor 302 could store a second time-stamp that indicates the time when fixed-position power was re-connected to the fixed wireless device. As another example, the processor 302 could stop the timer that was started in response to the processor 302 detecting the disconnection of fixed-position power at block 500. Other examples of how the processor 302 responds to detecting that fixed-position power has been re-connected are also possible.

Next, at block 504, a time-duration (quantity of time) that fixed-position power was disconnected to the fixed wireless device 300 is determined. The time-duration is determined in response to the detection that fixed-position power has been reconnected at block 502. The act of determining the time-duration could occur by the processor 302 executing machine language instructions arranged as the time logic 306.

For example, the processor 302 could execute machine language instructions to subtract the first time stamp (stored at block 500) from the second time stamp (stored at block 502) to determine the time-duration. As another example, the processor 302 could execute machine language instructions to read the timer (started at block 500 and stopped at block 502) to determine the time-duration. Other examples of determining the time-duration are also possible.

Next, block 506 involves determining that the time-duration (determined at block 504) exceeds a time-threshold stored in data storage. The act of determining the time-duration exceeds the time-threshold could involve the processor 302 executing machine language instructions arranged as the time logic 306. For example, the processor 302 could execute machine language instructions that compare the time-duration to the time-threshold. Other examples of determining that the time-duration exceeds the time-threshold are also possible.

Next, in response to determining that the time-duration exceeds the time-threshold, a communication with a network entity is initiated at block 508. Various methods could be used to initiate the communication with a network entity. For instance, the act of initiating a communication with a network entity could involve the fixed wireless device sending an origination message to a wireless network (i) to initiate a voice call via the PSTN, or (ii) to obtain packet data connectivity and initiate a packet data session via the packet-switched network.

By way of example and with reference to FIG. 2, the fixed wireless device 208 could send a voice call origination message to the wireless network 202, which then forwards the voice call origination message through the wireless network 202 from the BTS 214 to the BSC 216 and then to the MSC 218 which then communicates with a signaling transfer point to establish a voice call with a network entity connected to the PSTN 230.

As another example and with reference to FIG. 2, the fixed wireless device 208 could send a packet data session origination request message to the wireless network 202 to establish packet data connectivity and could then engage in a packet data session with the network server 226. In particular, (i) the packet data origination request message would pass to the BTS 214 and in turn to the BSC 216, (ii) the BSC 216 would assign an air interface traffic channel for use by the wireless device and would signal to the PDSN 220, (iii) the PDSN 220 and wireless device 208 would negotiate to establish a PPP session if one does not already exist, (iv) the wireless device would acquire an IP address if it does not already have one, and (v) the wireless device could then engage in packet data communication with the network server 226. Other examples of initiating packet data communication are possible as well.

After initiating a communication, next at block 510, a fixed wireless device and a network entity communicate information regarding the fixed wireless device. For example, the information regarding the fixed wireless device may be in the form of an analog signal, such as an analog voice signal. As another example, the information regarding the fixed wireless device may be in the form of a digital signal, such as a digital voice signal or a message comprising GPS coordinates. Other examples of the type of signal that comprises the information are also possible.

Further, the information may itself take various forms. For example, the content of the information may include the current location of the fixed wireless device. The current location may be used to update a registered location of the wireless device. As another example, the information may include a signal that triggers the network entity to determine the current location of a fixed wireless device. In this regard, the network entity could responsively: (i) work with a wireless network and positioning determining equipment to identify the current location of a fixed wireless device, and then (ii) send the current location to the fixed wireless device. The information may take other forms as well.

6. Conclusion

Exemplary embodiments of the present invention have been described above. Those skilled in the art will understand, however, that changes and modifications may be made to the embodiments described without departing from the true scope and spirit of the present invention, which is defined by the claims.

We claim:

1. A system comprising:
power logic arranged to detect disconnection of fixed-position power to the system and to detect connection of fixed-position power to the system, wherein the detected connection of fixed-position power occurs after the detected disconnection of fixed-position power to the system;
a back-up power source for operation of the power logic while fixed-position power to the system is disconnected;
location logic arranged to determine a current location of the system;
data storage for storing a time-threshold;
time logic arranged to determine, in response to the detected connection of fixed-position power to the system, that fixed-position power to the system had been disconnected for a time-duration that exceeds the time-threshold; and
a communication interface arranged to provide a network entity with the current location, wherein the communication interface provides the network entity with the current location in response to the determination that fixed-position power to the system had been disconnected for a time-duration that exceeds the time threshold.

2. The system of claim 1, further comprising:
a processor, wherein the power logic comprises circuitry that sends (i) a first signal to the processor to indicate when fixed-position power to the system is disconnected, and (ii) a second signal to the processor to indicate when fixed-position power is connected to the system.

3. The system of claim 1, wherein the communication interface comprises a wireless network interface for communicating with the network entity via a radio access network.

4. The system of claim 1, wherein the communication interface comprises a packet-data network interface for acquiring packet-data connectivity with the network entity.

5. The system of claim 1, wherein the communication interface is arranged to communicate information regarding the system by receiving the information from the network entity.

6. The system of claim 1, further comprising:
a processor, wherein the power logic, time logic, and location logic each comprise program instructions which are executable by the processor and which are stored in the data storage.

7. The system of claim 1, further comprising:
a processor;
wherein, while fixed-position power to the system is disconnected, the back-up power source provides power for operation of the time logic and the processor;
wherein the processor stores (i) a first time stamp that indicates when the fixed-position power to the system is disconnected, and (ii) a second time stamp that indicates when the fixed-position power to the system is reconnected; and
wherein the time logic comprises machine language instructions executable to determine the time-duration by determining a difference between the first time stamp and the second time stamp.

8. The system of claim 1, further comprising:
a processor;
wherein the back-up power source provides power for operation of the time logic and the processor while fixed-position power to the system is disconnected,
wherein the time logic comprises machine language instructions executable by the processor;
wherein, in response to the detected disconnection of fixed-position power to the system, the processor starts a timer to begin counting an amount of time that fixed-position power to the system is disconnected, and in response to the detected connection of fixed-position power to the system, the processor stops the timer counting the amount of time that fixed-position power to the system is disconnected; and
wherein, after the processor stops the timer, the processor (i) reads the timer so as to determine the time-duration, and (ii) thereafter compares the time-duration to the time-threshold so as to determine whether the time-duration exceeds the time-threshold.

9. A wireless local loop hub comprising:
data storage for storing a time-threshold;
power logic arranged to detect disconnection of fixed-position power to the wireless local loop hub and to detect connection of fixed-position power to the wireless local loop hub, wherein the detected connection of fixed-position power to the wireless local loop hub occurs after the detected disconnection of fixed-position power to the wireless local loop hub;
a back-up power source for operation of the power logic while fixed-position power to the wireless local loop hub is disconnected;
time logic arranged to determine, in response to the detected connection of fixed-position power to the wireless local loop hub, that fixed-position power to the wireless local loop hub had been disconnected for a time-duration that exceeds the time-threshold;
location logic arranged to determine a current location of the wireless local loop hub; and
a communication interface arranged to provide a network entity with the current location, wherein the communication interface provides the network entity with the current location in response to the determination that fixed-position power to the wireless local loop hub had been disconnected for the time-duration that exceeds the time-threshold.

10. The wireless local loop hub of claim 9, further comprising:
a processor, wherein the power logic comprises circuitry that sends (i) a first signal to the processor to indicate when fixed-position power to the wireless local loop hub is disconnected, and (ii) a second signal to the processor to indicate when fixed-position power is connected to the wireless local loop hub.

11. A method carried out at a wireless local loop hub, the method comprising:
storing a time-threshold at a data storage;
disconnecting fixed-position power to the wireless local loop hub;

while fixed-position power to the wireless local loop hub is disconnected, the wireless local loop hub (i) providing back-up power for the wireless local loop hub to use while fixed-position power is disconnected, and (ii) detecting the disconnection of fixed-position power to the wireless local loop hub;

after detecting the disconnection of fixed-position power to the wireless local loop hub, connecting fixed-position power to the wireless local loop hub, while fixed-position power is connected to the wireless local loop hub, the wireless local loop hub detecting the connection of fixed-position power to the wireless local loop hub and then determining that fixed-position power to the wireless local loop hub had been disconnected for a time-duration that exceeds the time-threshold stored at the data storage;

determining a current location of the wireless local loop hub; and in response to determining that fixed-position power to the wireless local loop hub had been disconnected for the time-duration that exceeds the time-threshold, providing to a network entity the current location of the wireless local loop hub.

12. The method of claim 11, further comprising:

storing a first time-stamp in response to detecting disconnection of fixed-position power to the wireless local loop hub, wherein the first time-stamp indicates when the disconnection of fixed-position power to the wireless local loop hub occurs, storing a second time-stamp in response to detecting connection of fixed-position power to the wireless local loop hub, wherein the second time-stamp indicates when the connection of fixed-position power to the wireless local loop hub occurs, and determining the time duration that fixed-position power had been disconnected by subtracting the first time-stamp from the second time-stamp.

13. The method of claim 11, further comprising:

in response to determining that fixed-position power to the wireless local loop hub had been disconnected for the time-duration that exceeds the time-threshold, initiating a communication with the network entity, wherein initiating the communication with the network entity comprises sending an origination message to a wireless network to obtain packed data connectivity and to initiate a packet data session via a packet-switched network.

14. The method of claim 11, further comprising:

wherein detecting disconnection of fixed-position power to the wireless local loop hub comprises receiving a first signal at a processor of the wireless local loop hub and then executing machine language instructions at the processor so as to detect that fixed-position power to the wireless local loop hub has been disconnected, and wherein detecting connection of fixed-position power to the wireless local loop hub comprises receiving a second signal at the processor and then executing machine language instructions at the processor so as to detect that fixed-position power has been connected to the wireless local loop hub.

15. The method of claim 11, wherein the wireless local loop hub comprises a communication interface for providing the network entity with the current location of the wireless local loop hub.

16. The method of claim 15, wherein the wireless local loop hub connects to land-line telephone equipment so as to provide the land-line telephone equipment access to a public switched telephone network via a radio access network.

17. The method of claim 16, wherein the land-line telephone equipment is selected from the group consisting of (i) a telephone, (ii) an answering machine, and (iii) a facsimile machine.

18. The method of claim 17, wherein the wireless local loop hub provides the land-line telephone equipment with a dial tone and a signal that indicates when the land-line telephone equipment should ring to announce an incoming call.

19. The method of claim 11, wherein the wireless local loop hub comprises a global positioning system (GPS) receiver for determining the current location of the wireless local loop hub.

* * * * *